Oct. 1, 1935.  S. D. MITEREFF  2,015,862
AUTOMATIC PILOT
Filed Aug. 18, 1934
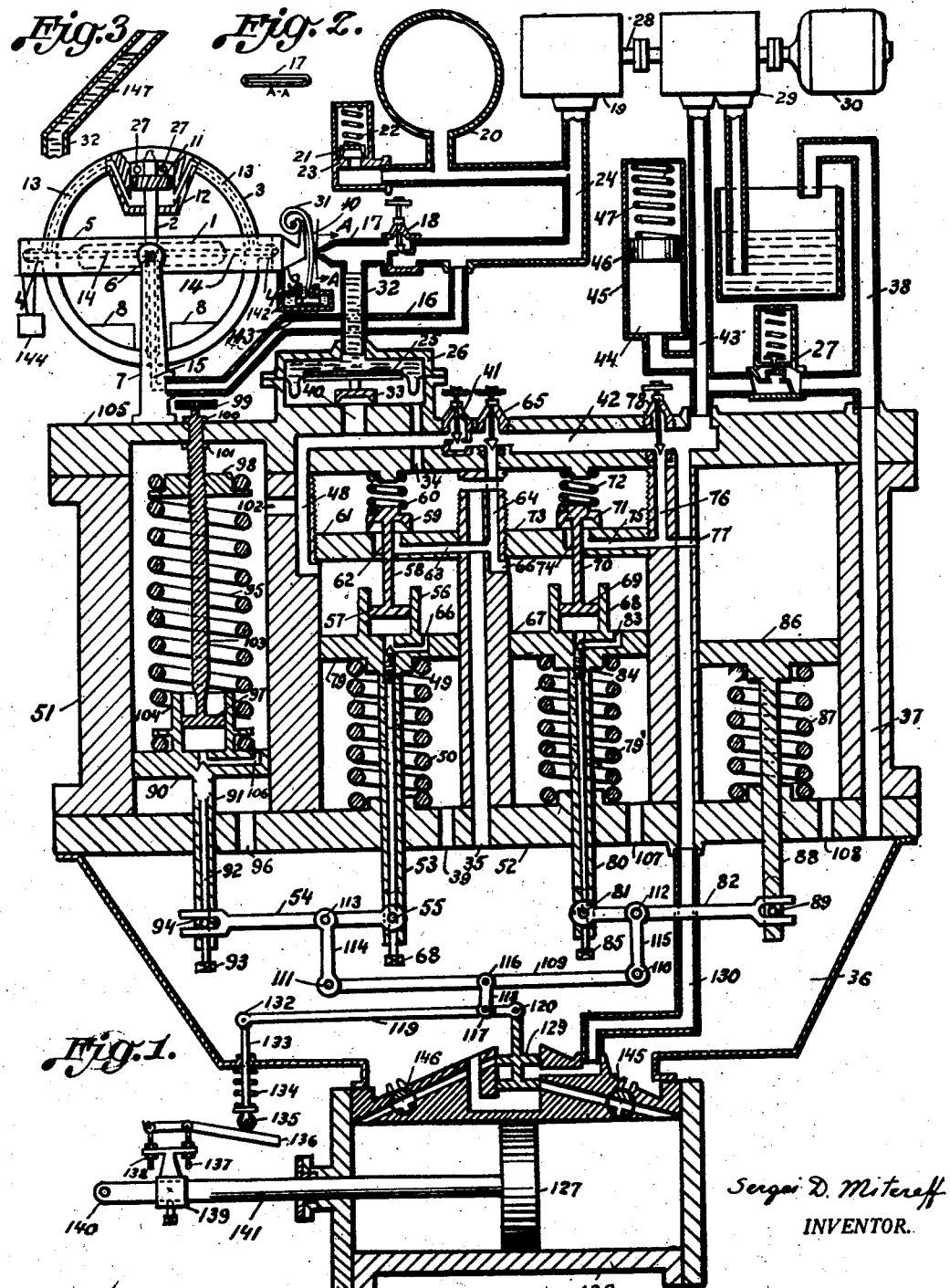
Sergei D. Mitereff
INVENTOR.
L. E. Dowling
D. G. Novikoff
WITNESSES Patented Oct. 1, 1935

2,015,862

UNITED STATES PATENT OFFICE 2,015,862

AUTOMATIC PILOT

Sergei D. Mitereff, Petersburg, Va.

Application August 18, 1934, Serial No. 740,410

10 Claims. (Cl. 244—29)

In the United States patent application on "Control devices" Serial No. 733,960, filed July 6, 1934 I disclosed new and useful improvements in the turbine speed governors.

The main advantage of these improvements lies in the fact that they make the speed governors respond to the rate of change plus the rate of the rate of change of the turbine speed in addition to the usual manner of response of the governors to the extent of change of the turbine speed from its normal desired value.

The present invention consists essentially in preferred means by which the above mentioned invention can be extended into the field of the automatic steering and piloting of ships, airships, airplanes, aerial and water torpedoes, and other movable objects.

The accompanying drawing illustrates these preferred means and:

Fig. 1 is the cross sectional view of the entire device, three of which are required to attain a complete stability of an airplane,—one for maintaining the lateral stability, another one for maintaining the longitudinal stability and the third one for maintaining the directional stability.

Fig. 2 is the view from the line A—A of the air jet nozzle used in this device,

Fig. 3 is a detail of a standard of position responsive to tilting of the craft.

The construction and operation of this automatic piloting and steering device will now be described.

The primary element of the device consists of the gyroscopic wheel 1 rotating at high speed. The axle 2, to which the wheel 1 is keyed, is mounted on conical bearings inside the ring 3. The lower part of the ring 3 is provided with weights 8. The ring 3 is pivoted by the conical bearings 4 inside the ring 5. The ring 5 is pivoted by the bearings 6 in the pedestal supports 7.

The axle 2 carries the air turbine wheel 11 encased in the casing 12. The lower part of the casing 12 is supplied with air under pressure through the ducts 13 in the ring 3, the ducts 14 in the ring 5 and the ducts 15 in the pedestal supports 7. Air passing through the wheel 11 escapes through the holes 27 in the casing 12.

In this way air under the wheel 11 not only drives the gyroscope 1 at a high rotative speed but also supports a large proportion of the weight of the gyroscope 1.

The source of air under pressure is the air compressor 19 of any desired type. The outlet of the compressor 19 is connected with the ducts 7 by means of the pipes 24 and 16. The pressure of air at the outlet of the compressor 19 is maintained constant by the relief valve 21 loaded by the spring 22 and seating against the valve seat 23.

The air chamber 20 at the compressor's outlet compensates any momentary fluctuations in pressure produced by the cyclical operation of the compressor 19. The compressor 19 is driven by the electric motor 30 through the shaft 28. The shaft 28 passes through and drives also the oil pump 29 which may be of a rotary type.

In order to facilitate the explanation of the operation of the device let it be assumed that the device is used for maintaining the lateral stability of an airplane. When used for this purpose the pedestal supports 7 are located parallel to the longitudinal axis of the airplane. Due to the combined effect of the downward force of the weights 8 and the gyroscopic action of the wheel 1, the ring 3 will always maintain a vertical position and moreover the axis of the ring 3 between bearings 4—4 will always be horizontal. It follows from this that the axis of the ring 5 between the bearings 4—4 also will be kept horizontal regardless of the lateral inclination of the airplane. The axis of the ring 5 between the bearings 6—6 will not always be horizontal due to the fact that a longitudinal inclination of the airplane will be transmitted to the ring 5 by the pedestal supports 7 which are attached fixedly to the airplane as is the rest of the mechanism. In line with the axis 4—4 is located the curved spring 10 attached to the ring 5 by the support 9. Abutting to the spring 10 is located the air jet nozzle 17. The tip of the nozzle 17 is of a very narrow cross section as is shown on Fig. 2. When the airplane is in horizontal lateral position in the horizontal center line of the nozzle 17 is located on the line between the bearings 4—4, and also on the center line of the spring 10. When there is no air pressure in the nozzle 17 the spring 10 presses against the nozzle and closes it tight. The force of the spring 10 pushing on the nozzle 17 is proportional to the distance of the nozzle 17 from the end 31 of the spring 10. The nozzle 17 is supplied with air from the air chamber 20 through the pipe 24 and the needle valve 18. The pressure of air in chamber 20 is considerably higher than the minimum pressure required to deflect the spring 10 away from the nozzle 17, with the result that the rate of air flow through the needle valve 18 is practically constant during the normal operation of the device. The pressure of air in the nozzle 17 is much lower, however, than is the pressure in the chamber 20, being practically equal to the minimum pressure required to deflect the spring 10 away from the nozzle 10 a very minute distance. It will be seen therefore that the pressure in the nozzle 17 varies in proportion to the distance of the nozzle 17 from the point 31. Since the distance between the nozzle 17 and the point 31 is proportional to the angle of the lateral inclination of the airplane it follows that the pressure in the nozzle 17 varies as the angle of the lateral inclination of the airplane. The pressure of air in the nozzle 17 is transmitted to the top of the diaphragm 25 through the pipe 32. The diaphragm 25 is encased in the casing 26 and it bears upon the cup bleeder valve 33.

The underside of the diaphragm 25 is open to the atmosphere, communicating with it by means of the duct 34, duct 35, space 36, duct 37 and the outlet pipe 38. The cup bleeder valve 33 is covering the duct 40 supplied with oil under pressure by the oil pump 29, through the pipe 43, duct 42 and the needle valve 41. The pressure at the pump outlet is maintained constant by the relief valve 27 while the pulsations of the oil pressure due to cyclical operation of the pump 29 are eliminated by the accumulator 44 consisting of the cylinder 45 containing the piston 46 loaded by the spring 47.

The pressure of oil in the duct 42 is considerably higher than the minimum pressure required to lift the cup bleeder valve 33 from its seat. Therefore, the rate of flow of oil through the needle valve 41 is substantially constant and moreover the pressure of oil in the port 40 is proportional to the total downward force acting upon the valve 33. Since the downward force on the valve 33 is generated by the diaphragm 25, the pressure of oil in the port 40 varies in proportion to the variation of the air pressure in the nozzle 17. Since the variation of the pressure in the nozzle 17 is proportional to the angular deviation of the airplane from its lateral horizontal position, the variation of the oil pressure in the port 40 is also proportional to the angular deviation of the airplane from its lateral horizontal position. The oil pressure existing in the port 40 is transmitted through the duct 48 to the upper side of the piston 79 mounted slidably in one of the four cylinders of the cylinder assembly 51.

The downward force exerted by the oil pressure on the piston 79 is counterbalanced by the compression spring 50 which is located between the piston 79 and the cover 52 of the cylinder assembly 51.

Since the deformation of a spring is proportional to the force acting upon it, the distance traversed by the piston 79, in response to the variation of oil pressure in the port 40, is proportional to the angular deviation of the airplane from its horizontal position.

The piston 79 carries the piston rod 53 projecting through the cover 52 and pivoted to the lever 54 at the point 55.

For the sake of clarity in arriving at the characteristic of the whole device it is advisable to set down the basic relationships between the function involved in the form of mathematical equations.

Adapting the following notations:

P—the angle formed by the airplane at the moment under consideration with its normal horizontal position.

$F_1$—the distance traversed by the point 55 from the position it occupies with the airplane in horizontal position and as measured at the same moment under consideration.

It should be pointed out that the value of P and F can be either positive or negative depending whether the airplane is inclined to the left or to the right from the horizontal position.

In view of the previous discussion we may write:

$$F_1 = k_4 P \qquad (1)$$

Where $k_4$ is the constant of proportionality depending upon the stiffness of the spring 10, size of the diaphragm 25, size of the valve 33 and the area of the tip of the nozzle 17.

The piston 79 carries the dash pot 56 inside of which fits slidably the piston 57 suspended by the rod 58 from the cup bleeder valve 59. The dash pot 56 is provided with the bypass 66. The opening of the bypass 66 is controlled by the needle valve 49 adjustable manually by turning the head 68.

The cup bleeder valve 59 covers the port 62 of the partition 61. Oil under pressure is supplied to the port 62 through the duct 63, duct 64 and the needle valve 65. The valve 59 is loaded by the compression spring 60, and also by the force exerted by the piston 57. The difference of oil pressure between the top and the bottom of the piston 57 is created by the motion of the piston 79 and this difference is proportional therefore to the speed of movement of the piston 79. It should be pointed out that the size of the piston 57 is so small compared with the size of the piston 79 and the needle valve 49 is opened so wide that the resistance of the oil in the dash pot 56 has practically no restraining effect upon the movement of the piston 79.

Since the distance traversed by the piston 79 is proportional to the angle of inclination of the airplane, the speed of movement of the piston 79 is proportional to the rate of change of the angle of inclination of the airplane from the horizontal.

Consequently the difference of pressure between the top and the bottom of the piston 57 is also proportional to the rate of change of the angle of inclination of the airplane.

Since the oil pressure in the port 62 varies as the total downward pressure acting upon the valve 59, the variation in the oil pressure in the port 62 is proportional to the rate of change of the angle of inclination of the airplane. The oil pressure in the port 62 is transmitted to the space above the piston 67 through the duct 63 and the duct 66. The piston 67 is mounted slidably in the cylinder of the cylinder assembly 51. The oil pressure acting on the top of the piston 67 is balanced by the compression spring 79' interposed between the bottom of the piston 67 and the cover 52.

Since the deformation of a spring is proportional to the force acting upon it, the distance traversed by the piston 67, in response to the variation of the oil pressure under the valve 59, is proportional to the rate of change of the angle of inclination of the airplane.

The piston 67 is provided with the piston rod 80 pivoted at point 81 to the left hand end of the lever 82.

Designating the distance traversed by the point 81 as "$F_2$" we may write:

$$F_2 = k_5 \frac{dP}{dT} \qquad (2)$$

Where:

P—the angle formed by the airplane at the moment under consideration with its normal lateral horizontal position.

$k_5$—the arbitrary constant of adjustment depending upon the opening of the valve 49.

T—time.

$d$—mathematical symbol used in calculus designating an infinitesimally small increment.

$$\frac{dP}{dT}$$

the rate of change of the angle of inclination of the airplane.

The piston 67 carries the dash pot 68 in which fits slidably the piston 69 suspended by the rod 70 from the cup bleeder valve 71. The dash pot 68 is provided with the bypass 83. The opening of the bypass 83 is controlled by the needle valve 84 which can be turned by hand at the head 85.

The cup bleeder valve 71 is loaded by the compression spring 72 and it covers the port 74 made in the partition 73. The port 74 is supplied with oil under pressure through the duct 75, the duct 76 and the needle valve 78.

From the previous description of the operation of the cup bleeder valve 59 it will be apparent that the oil pressure in the port 74 varies in proportion to the rate of change of the oil pressure in the port 62.

The oil pressure in the port 74 is transmitted through the duct 75 and the duct 77 to the upper side of the piston 86.

The piston 86 is mounted slidably in one of the cylinders of the cylinder assembly 51. The force of the oil pressure acting on the top of the piston 86 is balanced by the compression spring 87 interposed between the piston 86 and the cover 52.

Since the deformation of a spring is proportional to the force acting upon it, the distance traversed by the piston 86 is proportional to the variation of the oil pressure in the port 74.

The motion of the piston 86 is transmitted by the piston rod 88 to the right hand end of the lever 82, since the rod 88 is connected to the lever 82 by the pin joint 89.

Designating the distance traversed by the point 89 as "$F_3$" we may write:

$$F_3 = k_4 k_5 \frac{d^2P}{dT^2} \qquad (3)$$

Where the same notations are used as in the Equations (1) and (2) with the exception that $k_6$ is still another arbitrary constant of adjustment depending upon the opening of the needle valve 84.

It is well to point out also that the expression $$\frac{d^2P}{dT^2}$$

means the rate of the rate of change of the angle of inclination of the airplane.

The piston 90 is mounted slidably inside the remaining cylinder of the cylinder assembly 51. The oil pressure existing in the port 40 is transmitted to the top of the piston 90 through the port 102. The force exerted by the oil pressure on the piston 90 is balanced by the tension spring 95 attached to the piston 90 and to the plate 98.

The piston 90 carries the dash pot 104 inside of which fits slidably the piston 97 suspended by the rod 103 from the top cover 105 of the cylinder assembly 51. The rod 103 is fastened to the cover 105 by the shoulders 100 and 101. The rod 103 can be rotated by hand by turning the knob 99 at the upper end of the rod 103.

The plate 98 is fastened to the rod 103 by means of the screw thread. It will be clear from this description that the plate 98 could be moved up and down by turning the knob 99.

The dash pot 104 is provided with the bypass 106. The opening of the bypass 106 can be regulated by the needle valve 92 which can be turned by hand by means of the head 93.

The piston 90 is provided with the piston rod 91 which is connected to the left hand side of the lever 54 through the pin joint 94. The spring 95 is made purposely so long that its tension is practically constant during the normal operation of the device. The variation of the oil pressure in the port 40 is balanced therefore almost entirely by the resistance of the oil in the dash pot 104. The resistance of oil in the dash pot 104 is proportional, on the other hand, to the speed of movement of the piston 90.

Designating the distance traversed by the piston 90, in response to variation of oil pressure in the port 40 as $F_4$ we may write:

$$\frac{dF_4}{dT} = k_7 P \qquad (4)$$

Where the same notations are used as in the previous equations, except that $k_7$ is still another arbitrary constant of adjustment depending upon the opening of the valve 92.

By multiplying both sides of the Equation (4) by $dT$ and integrating we get:

$$F_4 = k_7 \int_{T_1}^{T_2} P\, dT \qquad (5)$$

The lever 109 is located below the levers 54 and 82. The right hand end 110 of the lever 109 is attached to the lever 82 by link 115 while the left hand end 111 of the lever 109 is attached to the lever 54 by the link 114. Due to the fact that the pin joint 112, by which the link 115 is secured to the lever 82, is located between the joints 81 and 89 of the lever 82, the distance traversed by the end 110 of the lever 109 is proportional to the algebraic sum of the distance traversed by the piston 67 and the distance traversed by the piston 86. Likewise, due to the fact that the pin joint 113, by which the link 114 is secured to the lever 54, is located between the joints 94 and 55 of the lever 54, the distance traversed by the end 111 of the lever 109 is proportional to the algebraic sum of the distance traversed by the piston 90 and the distance traversed by the piston 79.

Below the lever 109 is located the lever 119. The right hand end 120 of the lever 119 is connected to the stem of the cylindrical pilot valve 129. The valve 129 controls the flow of oil under pressure supplied through the pipe 130 either to the right or to the left hand side of the piston 127 sliding in the cylinder 128. More particularly when the valve 129 is moved downwards from its neutral position, the oil is admitted to the right hand side of the piston 127 and is exhausted from its left hand side. The piston 127 moves therefore to the left. If, on the other hand, the valve 129 is moved upwards, the oil is admitted to the left hand side of the piston 127 and is exhausted from its right hand side. The piston 127 moves therefore to the right. The sidewise movement of the piston 127 is transmitted as a vertical movement to the left hand end 132 of the lever 119 through the arrangement consisting of the inclined bar 136, attached to the piston rod 141 and the rod 133 attached to the point 132 by a pin joint.

In order to minimize friction, the rod 133 is provided with the roller 135 at its lower end.

The rod 133 is moved downwards by the compression spring 134. The adjustment of the ratio between the distance traversed by the piston 127 and the distance traversed by the left hand end 132 of the lever 119 is accomplished by the screw supports 137 and 138 fastened by nuts to the support 139 attached to the piston rod 141. The levers 109 and 119 are connected by the link 118. Since the pin joint 116, by which the link 118 is connected to the lever 109, is located between the points 110 and 111 of the lever 109, the distance traversed by the points 116 and 117 is proportional to the algebraic sum of the distances traversed by the piston 90, piston 79, piston 67 and the piston 86.

Designating the distance traversed by the point 117, in response to the change of the angle of inclination of the airplane from its horizontal position as "$F_5$" we can write:

$$F_5 = k_8 F_1 + k_9 F_2 + k_{10} F_3 + k_{11} F_4 \qquad (6)$$

Where the same notations are used as in previous equations except that $k_8$, $k_9$, $k_{10}$ and $k_{11}$ are constants of proportionality depending upon the ratio of the leverage system interconnecting the points 94, 55, 81 and 89 with the point 117.

Since a very small displacement of the pilot valve 129 from its neutral position results in a violent motion of the operating piston 127, it is clear that the pilot valve 129 is practically stationary during the normal operation of the device. This being the case, it is evident that a downward or upward movement of the point 117 is immediately followed by the proportional downward or upward movement respectively of the point 132. Since the left hand end 132 of the lever 119 is moving in proportion to the distance traversed by the operating piston 127, the distance traversed by the piston 127 is proportional to the distance traversed by the point 117.

Designating the distance traversed by the piston 127, in response to the change of the angle of inclination of the airplane, as "$F_6$" we may write:

$$F_6 = k_{12} F_5 \qquad (7)$$

Where $k_{12}$ is the arbitrary constant of adjustment depending upon the angle formed by the bar 136 with the direction of motion of the piston 127. As was explained before this angle can be varied at will by adjusting screws 137 and 138.

The left hand end 140 of the piston rod 141 is connected to the ailerons of the airplane either directly through the suitable cables or through the intermediary of the "joy-stick", in such a way as to make the movement of the ailerons proportional to the movement of the operating piston 127. It is not deemed necessary, however, to show the connection between the point 140 and the ailerons, since it can be easily designed by anyone skilled in the art to fit any particular case.

Designating the angle made by the ailerons with their neutral position, corresponding with the lateral horizontal position of the airplane, as "F" we may write:

$$F = k_{13} F_6 \qquad (8)$$

Where $k_{13}$ is the constant of proportionality depending upon the leverage ratio used in transmitting the motion of the piston 127 to the angular motion of the ailerons.

Substituting the value of $F_6$ from the Equations (7), (6) (5), (3) (2) and (1) into Equation (8) we get:

$$F = k_{13} k_{12} k_8 k_4 P + k_{13} k_{12} k_9 k_5 \frac{dP}{dT} +$$
$$k_{13} k_{12} k_{10} k_6 k_5 \frac{d^2 P}{dT^2} + k_{13} k_{12} k_{11} k_7 \int_{T_1}^{T_2} P dT \qquad (9)$$

Designating the group of constant coefficients before each of the terms of the right hand side of the Equation (9) as $K_1$, $K_2$, $K_3$ and $K_4$ we obtain:

$$F = K_1 \int_{T_1}^{T_2} P dT + K_2 P + K_3 \frac{dP}{dT} + K_4 \frac{d^2 P}{dT^2} \qquad (10)$$

The Equation (10) gives the relationship between the angle of inclination of the airplane and the angle of inclination of the ailerons. This equation represents, therefore, the characteristic of this automatic piloting device.

It is not considered necessary to present in this specification the mathematical proof of the inherent advantages of this characteristic in maintaining the stability of the airplane under the most adverse atmospheric conditions. It is sufficient to state here that the term $$K_1 \int_{T_1}^{T_2} P dT$$

takes care of the permanent change of conditions such, for instance, as the shifting of the load in the airplane, whereas the last three terms of the right hand side of the Equation (10) take care of any sudden changes such as occasioned by a sudden gust of wind, for instance.

Mention has not been made yet of some constructional details which could be very advantageously incorporated in the device.

In order to prevent the possibility of vibratory motion being set in the spring 10 by the action of the air jet against it, the dampening device consisting of the pot 142 filled with a viscous fluid is used. The end of the spring 10 is provided with a weight 143 which slides inside the pot 142. The combination of the inertia of the weight 143 and the fluid resistance of the pot 142 reduce considerably the natural period of vibration of the spring 10. On the other hand in order to increase the natural period of resonance of the space in the nozzle 17, the pipe 32 is filled with a liquid such as oil or mercury. In this way the possibility of resonance between the spring 10 and the space of the nozzle 17 is eliminated.

In order to counterbalance the weight of the spring 10 and the pot 142, the weight 144 is attached to the opposite side of the ring 5. The lateral thrust of the air jet issuing from the nozzle 17 can be counterbalanced by the similar jet acting on the opposite side of the ring 5.

In order to permit the hand operation of the ailerons, whenever such an operation is desirable, the three way plug valves 145 and 146 are installed in the operating cylinder.

These valves, if turned 90° from the position shown on Fig. 1, communicate both sides of the piston 127 with the exhaust space 36 with the result that the piston 127 offers no resistance to the movement of the piston 127 by the hand operation of the joy-stick.

Even though the application of the device to maintenance of the lateral stability only is specifically described, it will be clear to those skilled in the art that the device described is equally well applicable to maintenance of the longitudinal as well as the directional stability of an airplane.

If the device is used for maintaining the longitudinal stability of the airplane the only modification necessary would consist in turning the gyroscope assembly 90° from the position shown on Fig. 1 so as to make the supports 7 parallel to the short axis of the airplane, and also by attaching the point 140 to the elevator rather than to the ailerons.

In order to adapt the device for maintaining the directional stability of the airplane the gyroscope assembly should be turned in such a position as to make the axle 2 horizontal and to attach the point 140 to the rudder.

The true gyroscopic compass or the earth induction compass can also be used in connection with the device described in this specification.

In order to adapt the device for stabilization of an airplane against the vertical acceleration the gyro-assembly should be omitted and the diaphragm 25 should be made purposely heavy. It will be advisable also to partially suspend the weight of the diaphragm 25 with a spring. It is obvious that in this case the oil pressure under the valve 33 will vary as the vertical acceleration of the point of the plane where the pilot is located, with the result that if the pilot is located near the tip of the wing it would respond both to the roll of the plane as well as to a vertical acceleration of the plane as a whole.

If used for the above specified stabilization the point 140 of the pilot should be connected to either of the following three control surfaces:

(1) To the usual set of ailerons through a leverage system permitting a simultaneous upward and downward movement of ailerons independent of and superimposed upon the opposite-direction movement of ailerons by the lateral stabilizer.

(2) To a special set of ailerons moving in unison and in the same direction.

(3) To the flaps, if the airplane is equipped with them.

It should be pointed out that if the pilot is located near the tip of the wing, two of the units will be required, one on each wing, and that in this case the point 140 should be connected to the usual aileron of the respective wing. In this case the two pilots will take care automatically of the roll and the vertical acceleration and no separate lateral stabilizer will be required.

Since the variation of any function whatsoever, such for instance as temperature, speed, level, etc. can be easily converted into proportional variation of the fluid pressure, it will be clear that by connecting the pipe 32 to this pressure variation and by connecting the point 140 to a valve, the opening of which affects the function, the device described above can be easily adapted for control of such a function.

An important practical advantage of the device is that the dash pots 104, 56, and 68 are subjected to a pressure considerably higher than the atmospheric with the result that these dash pots will work equally well in a total or partial vacuum.

My invention is not limited, however, to the use of gyroscope for this purpose. The alternate device for measuring the inclination of the airplane is illustrated in Fig. 3. The tube 147 is filled with a heavy liquid such as mercury, for example. The tube 147 is inclined approximately 45° from the vertical when the airplane is in the horizontal position. The base of the tube 147 is attached to the pipe 32 described previously. The tube 147 is inclined in the direction in which it is desired to stabilize the airplane.

It will be clear that as the angle of inclination of the airplane changes the pressure at the base of the tube 147 changes also due to the variation of the length of the vertical column of mercury in the tube 147. The rest of the device will respond, of course, to the change of pressure in the pipe 32 in the manner described previously with the result that an automatic stabilization of the airplane is achieved.

It is well to point out that any of the terms in the right hand side of the Equation (10) can be easily eliminated by disconnecting the piston which gives rise to this term from the leverage system and by providing a fixed support for the end of the lever which is actuated by this piston.

I claim:

1. In a device for automatic piloting of a movable object including a rudder attached to the object, a servo motor actuating said rudder and a movable means moving in unison with and in proportion to the variation of the angle of inclination of the object from its normal attitude; an operative connection between said movable means and the servo motor consisting of a dash pot surrounded with viscous liquid under pressure; a piston fitting slidably into said dash pot; means for moving the dash pot in relation to the piston in unison with and in proportion to the movement of said movable means; a bypass between the space above and the space below said piston; an adjustable needle valve partially closing said bypass; a port supplied with fluid under pressure; means for varying the pressure in the port in unison with and in proportion to the variation in the difference of pressure between the space below and the space above the piston generated by the movement of the dash pot in relation to the piston; a pressure responsive movable means acted upon by the pressure in the port, said pressure responsive movable means moving, in response to the variation of pressure in the port, in unison with and in proportion to the variation of pressure in said port; a second dash pot surrounded with viscous liquid under pressure; a piston fitting slidably into the second dash pot; means for moving the second dash pot in relation to its piston in unison with and in proportion to the movement of the pressure responsive means; a bypass between the space above and the space below the last mentioned piston; an adjustable needle valve partially closing said bypass; a second port supplied with fluid under pressure; means for varying the pressure in the second port in unison with and in proportion to the variation in the difference of pressure between the space below and the space above the last mentioned piston generated by the movement of the second dash pot in relation to said piston; a second pressure responsive movable means acted upon by the pressure in the second port, said second movable means moving in unison with and in proportion to the variation of pressure in the second port; a movable means arranged to move with a speed proportional to the magnitude of the angle of inclination of the object from its normal attitude and in a direction coincident with the direction of said angle; a leverage system interconnecting the above mentioned four movable means, said leverage system additively combining the movements of each of said four movable means and an operative connection between said leverage system and the servo motor for actuating said servo motor in unison with and in proportion to said additive combination of the movements of each of the four last mentioned movable means.

2. In a device for automatic piloting of a movable object including a rudder attached to the object, a servo motor actuating said rudder and a movable means moving in unison with and in proportion to the variation of the angle of inclination of the object from its normal attitude; an operative connection between said movable means and the servo motor consisting of a resistance for flow of fluid; a supply of fluid for said resistance; means working from and in conjunction with said movable means for forcing fluid through said resistance in a volume coincident with and proportional to the distance traversed by said movable means; a port supplied with fluid under pressure; means for varying pressure in said port in unison with and in proportion to the variation of the pressure difference across said resistance; a pressure responsive movable means acted upon by the pressure in said port, said means moving, in response to the variation of the pressure in the port, in unison with and in proportion to the variation of pressure in the port; a second resistance for flow of fluid; a supply of fluid for said second resistance; means working from and in conjunction with the pressure responsive means for forcing fluid through the second resistance in a volume coincident with and proportional to the distance traversed by the pressure responsive means; a second port supplied with fluid under pressure; means for varying pressure in the second port in unison with and in proportion to the variation of the pressure difference across the second resistance; a second pressure responsive means acted upon by the pressure in the second port, said second means moving, in response to the variation of pressure in the second port, in unison and in proportion to the variation of pressure in the second port; a movable means arranged to move with a speed proportional to the magnitude of the angle of inclination of the object from its normal attitude and in a direction coincident with the direction of said angle; means for producing an effect coincident with and proportional to the algebraic sum of the separate distances traversed by each of the above mentioned four movable means; and means for actuating the servo motor in unison with and in proportion to said effect.

3. In an automatic regulator for maintaining a function at a substantially constant normal value, means moving in response to the variation of the function in unison with and in proportion to the extent of change of the function from its normal value, means moving in response to the variation of the function with a speed proportional to the extent of change of function from its normal value and in a direction coincident with the direction of the change of function from its normal value, a leverage system effecting an additive combination of the distances traversed by each of the two first mentioned means, means for affecting the variation of the function, and an operative connection between the leverage system and the last mentioned means for actuating the last mentioned means in unison with and in proportion to said additive combination of the distances.

4. In a regulator for maintaining a function at a substantially constant normal value, means moving in response to the variation of the function in unison with and in proportion to the extent of change of the function from its normal value, means moving in response to the variation of the function with a speed proportional to the extent of change of the function from its normal value and in a direction coincident with the direction of change of the function from its normal value, means moving in unison with and in proportion to the rate of change of the function, a leverage system effecting an additive combination of the distances traversed by each of the three first mentioned means, means for affecting the variation of the function, and an operative connection between the leverage system and the last mentioned means for actuating the last mentioned means in unison with and in proportion to said additive combination of the distances.

5. In an automatic regulator for maintaining a function at a substantially constant normal value, means moving in response to the variation of the function in unison with and in proportion to the extent of change of the function from its normal value, means moving in response to the variation of the function with a speed proportional to the extent of change of the function from its normal value and in a direction coincident with the direction of change of the function from its normal value, means moving in unison with and in proportion to the rate of change of the function, means moving in unison with and in proportion to the rate of the rate of change of the function, a machine element effecting an additive combination of the distances traversed by each of the four first mentioned means, means for affecting the variation of the function, and an operative connection between said machine element and the last mentioned means for actuating the last mentioned means in unison with and in proportion to said additive combination of the distances.

6. In an automatic regulator for maintaining a function at a substantially constant value, a means for producing the variation in pressure which is indicative of the variation of the function and comprising, a nozzle, a cantilever spring member abutting to the nozzle and hindering the issue of the fluid from said nozzle, and a means for moving the spring member transversely in relation to the nozzle a distance proportional in magnitude and corresponding in direction to the extent of variation of said function from its normal value.

7. In an automatic stabilizer for airplanes, a weight, a cup bleeder valve loaded by said weight, a port covered by said valve, a substantially constant supply of fluid for said port, and a pressure responsive control device moving in accordance with the change of pressure in said port resulting from the changing inertia or gravitational force acting upon the weight.

8. In an automatic stabilizing device, a pressure transformer comprising, a pressure cell acted upon by a primary pressure, a bleeder valve, a port covered by said valve, a substantially constant supply of fluid to said port, a connection between said pressure cell and said bleeder valve for loading said valve with a force proportional to the force generated by the action of the primary pressure upon said cell and thus producing a secondary pressure in said port, said secondary pressure having a fixed ratio to the primary pressure.

9. In an automatic piloting device, a means for transforming a controlling force into a fluid pressure proportional to said force consisting of a bleeder valve loaded by said force, a port covered by said valve and a substantially constant supply of fluid to said port, said valve being in equilibrium under the action of the controlling force upon it and the force of fluid pressure in said port acting upon the valve in direct opposition to said controlling force.

10. In an automatic stabilizing device for a movable object, a tube filled with a heavy liquid, said tube being attached to the object and being inclined approximately forty-five degrees from the horizontal plane when the object is in its desired position, said inclination of the tube being in the direction in which the object is to be stabilized, a means for affecting the position of the object, and an operative connection between said tube and said means, said operative connection comprising a pressure responsive element connected to the base of said tube and actuated by the pressure variation at the base of said tube resulting from the change in the head of the liquid in said tube with the variation of the angle of inclination of the object.

SERGEI D. MITEREFF.